United States Patent [19]

Spada

[11] Patent Number: 4,931,892

[45] Date of Patent: Jun. 5, 1990

[54] LONG LIFE MAGNETORESISTIVE HEAD OF THE NON-SHUNT BIAS TYPE

[75] Inventor: Frederick E. Spada, Carlsbad, Calif.

[73] Assignee: Eastman Kodak Company, Rochester, N.Y.

[21] Appl. No.: 225,127

[22] Filed: Jul. 28, 1988

[51] Int. Cl.⁵ .............................................. G11B 5/30
[52] U.S. Cl. ................................................... 360/113
[58] Field of Search ...................... 360/113, 125–126; 338/32 R

[56] References Cited

U.S. PATENT DOCUMENTS

| | | | |
|---|---|---|---|
| 4,663,684 | 5/1987 | Kama et al. | 360/113 |
| 4,825,325 | 4/1989 | Howard | 360/113 |
| 4,841,399 | 6/1989 | Kitada et al. | 360/113 |

Primary Examiner—John H. Wolff
Attorney, Agent, or Firm—Robert F. Cody

[57] ABSTRACT

In a MR head of the non-shunt bias type, one or more extremely thin coatings of a sacrificial conductive material are applied on the magnetoresistive strip, each such coating being so thin that it has extremely high sheet resistance in comparison to the sheet resistance of the MR strip. Because the sacrificial coating(s) is (are) in direct contact with the MR strip, the requirement for electrical conductivity between the coating(s) and the MR strip is (are) met; and because the sacrificial coating(s) is (are) of high resistivity, very little sense current is sapped away from the MR strip by the sacrificial coating(s), with attendantly very little decrease in the sensitivity of the head. By sandwiching the MR strip between equi-thick sacrificial coatings, whatever leakage currents flow through the high resistivity sacrificial coatings are productive of equal and opposite biasing effects vis-a-vis the MR strip, i.e. the sacrificial coatings produce no net bias field and are magnetically transparent to the MR strip.

10 Claims, 1 Drawing Sheet $R_M \ll R_{Ti}$ $R_M \ll \dfrac{R_{Ti}^2}{2R_{Ti}}$

LONG LIFE MAGNETORESISTIVE HEAD OF THE NON-SHUNT BIAS TYPE

BACKGROUND OF THE INVENTION

1. Field of the Invention

This invention relates to a magnetoresistive (MR) head of the type wherein an elongated thin film is brought into direct contact with a recording medium, and, in response to signals recorded in the medium, signal current flowing the length of the film is caused to vary. More particularly, however, the invention relates to an improved form of MR head of the "non-shunt bias" type . . . which head is characterized by especially long life.

2. Description Relative to the Prior Art

Shunt biased MR heads are well known to the art. C. D. Mee and Eric Daniel, in their recent book "Magnetic Recording", McGraw Hill Inc., 1987, page 290, FIG. 4.33 describe a shunt biased MR head. In their depiction, an electrically conductive layer is indicated as running parallel to the length of an MR strip, such conductive layer being so disposed that, when carrying a current therethrough, it creates an encircling magnetic field about the conductive layer which exerts a bias against the magnetic moment associated with the MR strip. The electrically conductive layer in a shunt biased MR head may be of any convenient form; and, indeed, chromium, titanium, and other metallic layers have been employed for current shunting purpose, all such layers being however sufficiently thick so as to exhibit low sheet resistance to the flow of bias-producing shunt current. Typically, a shunt bias layer is as thick as, or thicker than, an MR strip with which it cooperates.

A problem associated with any MR head concerns the matter of corrosion associated with the MR strip, i.e. the strip being typically comprised of nickel iron (NiFe) permalloy, it is subject to the deleterious effects of electrochemical attack.

It has long been known, say, in the protection of 1. the hull and propeller of a ship from corrosion to strategically place a chemically more active (i.e. according to the electrochemical series) "sacrificial" material, such as zinc, in proximity to the hull and propeller, thereby to "anodically" corrode away the zinc instead of the steel and brass of which the hull and propeller are made, and 2. the use of sacrificial bars of, for example, magnesium in proximity to underground pipes and cables to protect such pipes and cables from corrosion, the magnesium being in such case the preferntial element of anodic decay.

See "Principles and Applications of Electrochemistry" by W. A. Koehler, John Wiley and Sons Inc., New York, page 364 et seq.

(As is known, for sacrificial protection to work, electrical conductivity must exist between the sacrificial conductor and the component being protected.)

SUMMARY OF THE INVENTION

In a MR head of the non-shunt bias type, the concept of the invention is to call for one or more extremely thin coatings of a sacrificial conductive material on the magnetoresistive strip, each such coating being so thin that it has extremely high sheet resistance in comparison to the sheet resistance of the MR strip in the absence of a signal field impressed thereon, such sheet resistance of the MR strip being hereinafter referred to as its "quiescent" resistance. Because the sacrificial coating(s) is (are) in direct contact with the MR strip, the requirement for electrical conductivity between the coatings(s) and the MR strip is (are) met; and because the sacrificial coating(s) is (are) of high resistivity, very little sense current is sapped away from the MR strip by the sacrificial coating(s), with attendantly very little decrease in the sensitivity of the head. By sandwiching the MR strip between equi-thick sacrificial coatings, whatever leakage currents flow through the high resistivity sacrificial coatings are productive of equal and opposite biasing effects vis-a-vis the MR strip, i.e. the sacrificial coatings produce no net bias field and are magnetically transparent to the MR strip.

The invention will now be described with reference to the figures of which

FIG. 1 is a perspective diagram of an exploded view of a MR head according to the invention, and FIG. 2 is a diagram of a circuit which serves to illustrate the efficacy of the invention.

DETAILED DESCRIPTION

Figure 1:
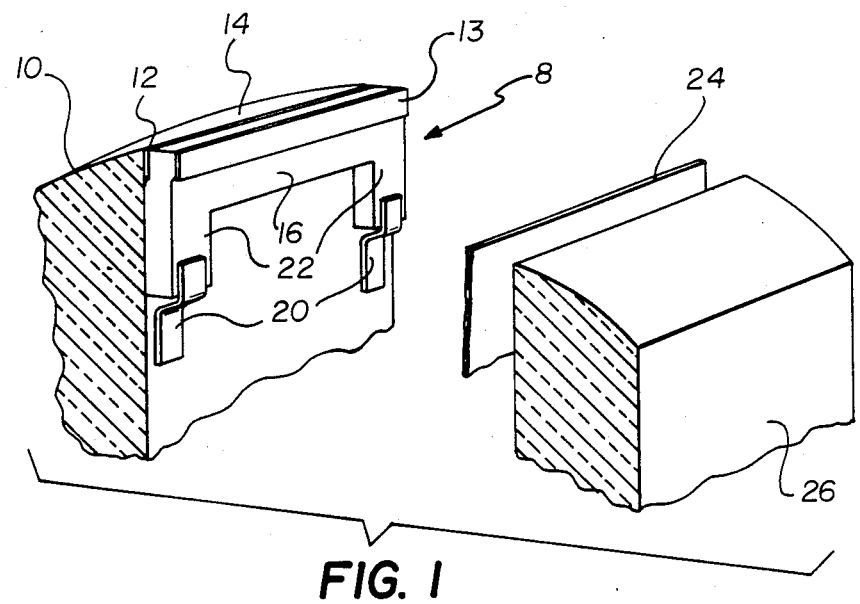

Referring to FIG. 1, a MR section 8 of a multitrack head is shown comprised of a non-magnetic (e.g. ceramic) support 10 having an extremely thin (e.g. 50 Å) coating 12 of titanium deposited in proximity to the media contacting surface 14 of the head. A MR element 16, typically formed of NiFe permalloy to about 400 Å, is deposited atop the titanium coating 12; and a second titanium coating 13 also to about 50 Å is deposited on the MR element 16 in proximity to the medial contacting surface 14, thereby to sandwich the element 16 between essentially identical titanium coatings. Electrical contacts 20, e.g. of gold, are brought to the legs 22 of the MR element 16, thereby to assure that the contacts are distal with respect to the medial contacting surface 14. A passivation coating 24, e.g. of $SiO_2$, is then deposited over the MR element 16 and its cooperating structures, after which the assembly is completed by means of a non-magnetic cap 16, which may also be of ceramic.

Figure 2:
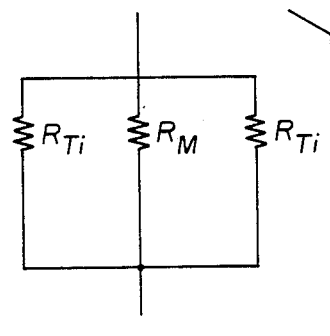

Because the titanium coatings 12, 13 are in electrical contact with the MR element 16, they carry leakage bias currents away from the MR element 16, albeit that such currents are extremely small because of the high sheet resistivity of such coatings 12, 13 in comparison to the resistivity of the MR element 16. See FIG. 2 which indicates the relative resistivities $R_{Ti}$ and $R_M$ of the titanium and magnetoresistive structures respectively. In this regard, it will be appreciated that as the thicknesses of the titanium coatings increase, their respective leakage currents also increase, thereby lessening head sensitivity. Indeed, in accordance with the invention in its presently preferred form, the coatings 12, 13 should have thicknesses less than about 200 Å apiece.

The fact that there is electrical contact among the components 12, 13, 16 . . . and that the NiFe of the MR element is more "noble" than the titanium coatings 12, 13 . . . the coatings are "sacrificed" in an electrochemical sense, thereby to extend the useful life of the structure of FIG. 1.

As will be appreciated, gold (contacts 20) being even more "noble" than NiFe is intentionally kept away form the media contacting surface 14, thereby to preclude "sacrificing" the NiFe MR element at the expense of the gold contacts 20.

Since the structure of FIG. 1 is "not" a shunt biased MR head, additional means must be provided to bias the head. In this regard, an electrically insulated soft adjacent magnetic layer, or an external field from a permanent magnet may be utilized.

The invention has been described in detail with particular reference to a presently preferred embodiment, but is will be understood that variations and modifications can be effected within the spirit and scope of the invention. For example, although titanium has been disclosed as "sacrificial" material, other such material, e.g. tin, aluminum, zirconium, and chromium, may be utilized as well.

What is claimed is:

1. A MR magnetic head of the non-shuntbiased type comprising
   a. non-magnetic support means having a media contacting surface,
   b. A MR element supported by said support means at said media contacting surface and having a quiescent resistance thereto and
   c. A layer of electrically conductive, electrochemically sacrificial non-antiferromagnetic material supported at said media contacting surface, and in electrical contact with said MR element, said layer being sufficiently thin that the resistance thereof is significantly greater than the resistance of said MR element.

2. A magnetic head of claim 1 further comprising a second layer of electrically conductive, electrochemically sacrificial, non-antiferromagnetic material in electrical contact with said MR element, said two layers being so disposed that they sandwich said MR element therebetween.

3. The magnetic head of claim 2 wherein said two layers of electrically conductive material are of the same material, and are of like thickness.

4. The magnetic head of claim 3 wherein said two layers of electrically conductive material are equi-thick to about 200 Å, and said MR element is comprised of NiFe.

5. The magnetic head of claim 1 wherein said MR element is comprised of NiFe, and said layer of electrochemically sacrificial material is comprised of one or more elements from the grouping thereof comprising tin, aluminum, zirconium, titanium and chromium.

6. The magnetic head of claim 1 wherein said MR element is comprised of NiFe, and said layer of electrochemically sacrificial material is comprised of titanium to a thickness of less than 200 Å.

7. The magnetic head of claim 1 further comprising contact means, more noble than said MR element, electrically coupled to said MR element at points thereof which are distal with respect to said media contacting surface.

8. The magnetic head of claim 7 wherein said MR element is comprised of NiFe, and said layer is comprised of a less noble material than said NiFe.

9. A non-shunt biased type of MR head comprising
   a. a MR element comprised of NiFe, and
   b. At lest one non-antiferromagnetic coating of titanium on at least one side of said NiFe MR element, which coating is sufficiently thin that the resistance of said titanium coating is several times greater than the quiescent resistance of said MR element, both the NiFe of said MR element, and the titanium of said coating being exposed at the medial contacting surface of said head.

10. A non-shunt biased type of MR head comprising
    a. a MR element comprised of NiFe, and
    b. at least one non-antiferromagnetic coating of chromium on at least one side of NiFe MR element, which coating is sufficiently thin that the resistance of said chromium coating is several times greater than the quiescent resistance of said MR element, both the NiFe of said MR element, and the chromium of said coating being exposed at the media contacting surface of said head.

* * * * *